US007089318B2

United States Patent
Krishnaswamy et al.

(10) Patent No.: US 7,089,318 B2
(45) Date of Patent: *Aug. 8, 2006

(54) MULTI-PROTOCOL COMMUNICATION SUBSYSTEM CONTROLLER

(75) Inventors: Srivatsa Krishnaswamy, Bangalore (IN); Franz Koppold, Karlsfeld (DE); Srinivas Varadarajan, Karnataka (IN); Subbraya Shailesh Kumar Dave, Tamil Nadu (IN); Ramamurthy Shamasastry, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 10/439,399

(22) Filed: May 16, 2003

(65) Prior Publication Data

US 2003/0200325 A1 Oct. 23, 2003

Related U.S. Application Data

(63) Continuation of application No. 09/049,676, filed on Mar. 27, 1998, now Pat. No. 6,976,080.

(51) Int. Cl.
G06F 15/16 (2006.01)
G06F 9/46 (2006.01)
(52) U.S. Cl. ..................... 709/230; 719/313
(58) Field of Classification Search ............... 709/230, 709/223
See application file for complete search history.

(56) References Cited

U.S. PATENT DOCUMENTS

| 5,479,475 A | 12/1995 | Grob et al. |
| 5,491,693 A | 2/1996 | Britton et al. |
| 5,548,726 A | 8/1996 | Pettus |
| 5,572,675 A | 11/1996 | Bergler |
| 5,764,915 A | 6/1998 | Heimsoth et al. |
| 5,774,668 A | 6/1998 | Choquier et al. |
| 5,793,958 A | 8/1998 | Clement et al. |
| 5,802,306 A | 9/1998 | Hunt |
| 5,903,754 A | 5/1999 | Pearson |
| 6,003,084 A | 12/1999 | Green et al. |
| 6,006,267 A | 12/1999 | Nguyen et al. |
| 6,023,734 A | 2/2000 | Ratcliff et al. |
| 6,044,407 A | 3/2000 | Jones et al. |
| 6,163,797 A * | 12/2000 | Eckley et al. ............... 709/203 |
| 2003/0200325 A1* | 10/2003 | Krishnaswamy et al. ... 709/230 |

OTHER PUBLICATIONS

Lee, D.C. et al., "The next generation of Interent: aspects of the Interent protocol version 6", IEEE Network, vol. 12, iss. 1, pp. 28-33, Feb. 1998.*
Loukola, M.V. et al., "New possibilities offered by IPv6", IEEE Conference on Computer Communications and Networks, pp. 548-552, Oct. 1998.*

* cited by examiner

Primary Examiner—Patrice Winder

(57) ABSTRACT

A common programming interface in a communication subsystem controller allows protocols to be developed or modified to communicate with the communication subsystem controller. Once a protocol layer is able to communicate with the communication subsystem controller, the protocol layer is stacked with other protocol layers compatible with the communication subsystem controller. A table in the communication subsystem controller specifies an order of protocol layers in the protocol stack. These protocol layers in the protocol stack communicate with their adjacent protocol layers through the communication subsystem controller.

22 Claims, 9 Drawing Sheets

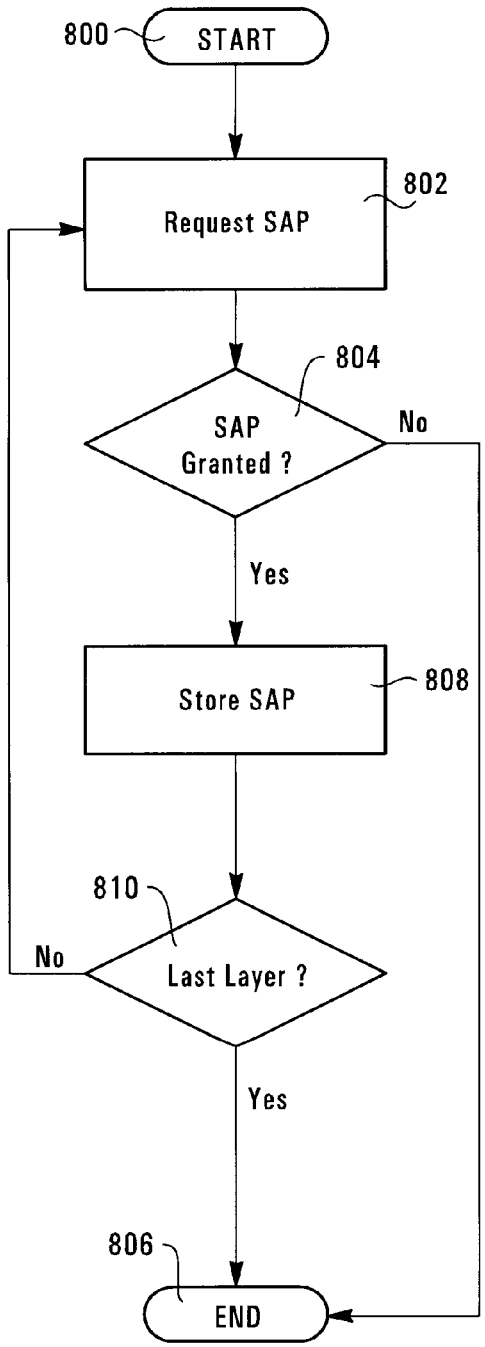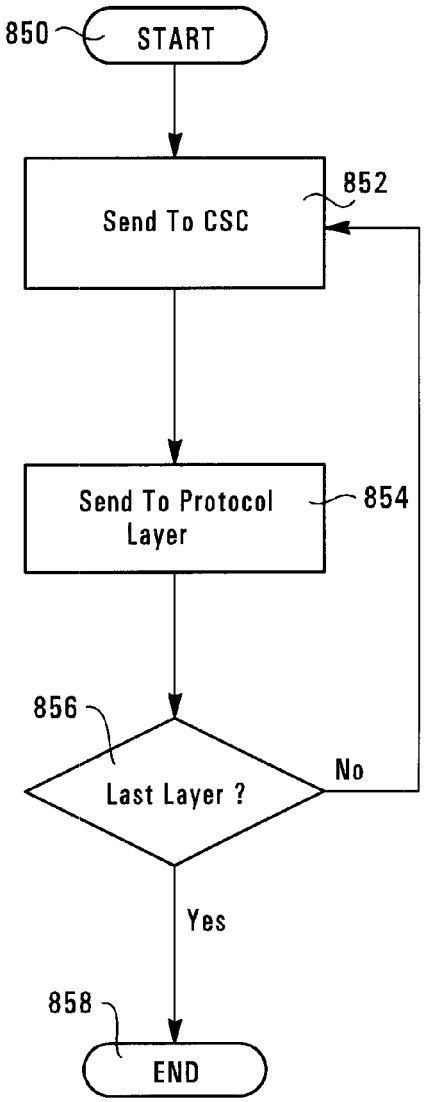
Figure 8A
Figure 8B

MULTI-PROTOCOL COMMUNICATION SUBSYSTEM CONTROLLER

CROSS REFERENCE TO RELATED APPLICATIONS

This is a continuation of application Ser. No. 09/049,676 filed on Mar. 27, 1998, now U.S. Pat. No. 6,976,080, which is hereby incorporated by reference herein.

FIELD OF INVENTION

The invention relates generally to communication subsystems of computers connected to communication networks. In particular, it relates to a communication subsystem having a communication subsystem controller and a set of communication protocols to provide for the transfer of messages.

BACKGROUND OF THE INVENTION

Existing complex global business systems, for example, financial and airline reservation business systems, provide their commercial services to users through worldwide communication networks. These users access the commercial services via terminals or computers, also known as client nodes, connected to the communication networks. Such business systems typically use special purpose computers, also known as server nodes, to run business application programs to provide their commercial services. At the same time, these business systems also typically rely upon other special purpose computers to handle the intricacies of providing worldwide connectivity to the client nodes through the communication networks.

The users, which include business partners who interact and share information with these business systems, are usually situated all over the world. Such business partners may also run other application programs on remote business systems to provide their own type of commercial services. These users and business partners use a variety of legacy systems—terminals, or special purpose computers running application programs, which are outmoded by new technology—to communicate with the server nodes. For service reliability and efficacy, the server nodes are usually located at a central site to provide distributed network services; they carry out shared processing and storage activities to provide the required commercial services. Such server nodes are also known as back-ends. For example, users and business partners of financial and airline reservation business systems interact with the application programs on the respective back-ends to carry out transactions such as fund transfers and airline ticket bookings respectively. Messages that make up part of these transactions arrive at the central site from around the world and are usually routed via special purpose computers, known as gateway nodes or front-ends, to the distributed network of back-ends.

FIG. 1 illustrates a typical Centralized Business System 102. Most back-ends 104 are located at a central site and interconnected to form an Enterprise Local Area Network (E-LAN) 106 to provide distributed network services. Connected to a Wide Area Network (WAN) 110 are a series of client nodes 112 which are located at different geographical locations. Some server nodes which are part of the Centralized Business System 102, such as remote server node 108, are not connected to the E-LAN 106 but to this WAN 110. The client nodes 112 may use different types of terminals, printers and computers to communicate with the server nodes to access the commercial services provided by the Centralized Business System 102. To shield the back-ends 104 in the E-LAN 106 from the intricacies of providing worldwide connectivity through dissimilar communication networks, i.e., the E-LAN 106 and the WAN 110, a front-end 114 is used. An application program on the front-end 114 also translates the messages coming from the different client nodes 112 into a format in which the application programs on the back-ends 104 can understand and vice-versa.

Common to each of the back-ends, front-end and client nodes in the above illustrated example is a communication subsystem which includes a set of communication protocols for providing connectivity to the various types of communication networks. An example of a communication subsystem is an International Standards Organization (ISO) Open Systems Interconnection (OSI) reference model. In the OSI reference model, the communication protocols are "stacked" to form a protocol stack, whereby each of the communication protocol performs a well defined function that contributes to the overall intents and purposes of the communication subsystem in providing network connectivity. FIG. 2 illustrates the relation between two communication protocols, also known as protocol "layers" 206, 208 in the context of a protocol stack, at their interface 202 where messages 204 are transferred. A protocol layer N 206 implements its services, for example, fast and expensive communication or slow and cheap communication, used by another protocol layer N+1 208. Hence, in this example, the protocol layer N 206 is known as a service provider and the protocol layer N+1 208 is known as a service user. The protocol layer N 206 provides its services to the protocol layer N+1 208 at service access points 210 (SAPs), where each SAP identifies a resource within the protocol layer. Each of the messages 204 "passes" through these SAPs 210 as they are conveyed between the back-ends and the front-end, or the front-end and the client nodes, to form meaningful business transactions.

While the above examples of complex global business systems using special purpose computers to provide commercial services and worldwide connectivity have achieved wide commercial implementation, they suffer from disadvantages. Many of the back-ends and front-ends of these existing business systems use outmoded technology. As a result, the application programs on these back-ends and front-ends are costly and difficult to enhance or modify. In addition, such business systems do not allow new client connections to be easily added via new communication protocols, or to leverage off evolving technologies like the Internet. To overcome these limitations, efforts are underway to migrate existing business systems to "open" business systems. The aim of such efforts is to functionally replace the existing business systems with open business systems, i.e., business systems that are open for communication with any other systems, while additionally providing a wide range of connectivity, extensibility and fault tolerance.

While a large number of client nodes exists and are connected to existing business systems, each of these client nodes employs its own communication subsystem. As a result, each of these communication subsystems may use different protocol layers, and therefore a different protocol stack, to communicate with the back-ends. The need to provide connectivity to a wide range of existing client nodes, and new client nodes, requires that the communication subsystems of the front-ends are able to flexibly mix and match a myriad of protocol layers. In turn, the need to be able to flexibly mix and match a myriad of protocol layers requires a well-defined interface between adjacent protocol layers in a protocol stack.

As existing business systems are migrated to open business systems, the open business systems should not only provide the flexibility to adapt to the quick market changes, but also interoperate with the variety of connected legacy systems. The legacy systems usually have their own proprietary communication subsystems. Since a large number of legacy systems is in use, and each of them stacks the protocol layers in its own way, it is necessary to provide means to develop and implement proprietary protocol layers so that the migration is easier and cost effective.

In the event of node failures, the communication subsystems must be able to recover quickly and restore the protocol stacks so that communication may resume. Therefore, the need to facilitate such recovery activities is highly desired in a quick-recovery communication subsystem.

As newer application programs are developed and older application programs are migrated, it is also necessary that these application programs be shielded from the intricacies of the communication subsystems. Hence, it is important to draw a distinction between application programs and communication subsystems by having well-defined interfaces between the two.

Accordingly, the present invention provides a well-defined interface between adjacent protocol layers in a protocol stack, a means to develop and implement new or proprietary protocol layers, a quick-recovery communication subsystem and a well-defined interface between an application program and a communication subsystem.

SUMMARY OF THE INVENTION

A communication subsystem of a computer is provided with a communication subsystem controller to enable the computer to be connected to a communication network. The communication subsystem facilitates an application program in the computer to exchange information with other application programs in other computers connected to the communication network. A protocol stack in the communication subsystem is built from a series of protocol layers and the communication subsystem controller. In the protocol stack, the communication subsystem controller forms an interface between the application program and protocol stack. The communication subsystem controller also forms an interface between each pair of adjacent protocol layers in the protocol stack. When information is transferred between the application program and the protocol stack, and between adjacent protocol layers in the protocol stack, it is done through the communication subsystem controller.

In a preferred embodiment of the invention, a set of predetermined protocol stack information is stored in a memory of the computer. In addition, a set of service access point information is stored in the memory. The set of service access point information is also stored in a persistent storage. A preselected stack of network-dependent protocol layers is also used to build the protocol stack. Information is then transferred between the preselected stack of network-dependent protocol layers and the series of protocol layers through an adapter layer and the communication subsystem controller. The communication subsystem controller also uses a persistent storage to store information for supporting recovery activities.

The communication subsystem controller therefore provides a well-defined interface between the adjacent protocol layers in the protocol stack and a well-defined interface between the application program and the protocol stack. By providing such well-defined interfaces, the communication subsystem controller also provides a means to develop and implement new or proprietary protocol layers cost effectively. In addition, the communication subsystem controller also provides means for the quick-recovery of the communication subsystem. Hence, the communication subsystem controller can be advantageously used in communication subsystems of client, server and gateway nodes.

BRIEF DESCRIPTION OF THE DRAWINGS

The invention will be better understood with reference to the drawings, in which:

FIG. 8A is a flowchart illustrating a method of requesting a session over a series of protocol layers in a protocol profile using the communication subsystem controller in FIG. 4;

FIG. 8B is a flowchart illustrating a method of sending a message down a series of protocol layers in a protocol profile using the communication subsystem controller in FIG. 4.

DETAILED DESCRIPTION OF THE PREFERRED EMBODIMENT

Figure 1:
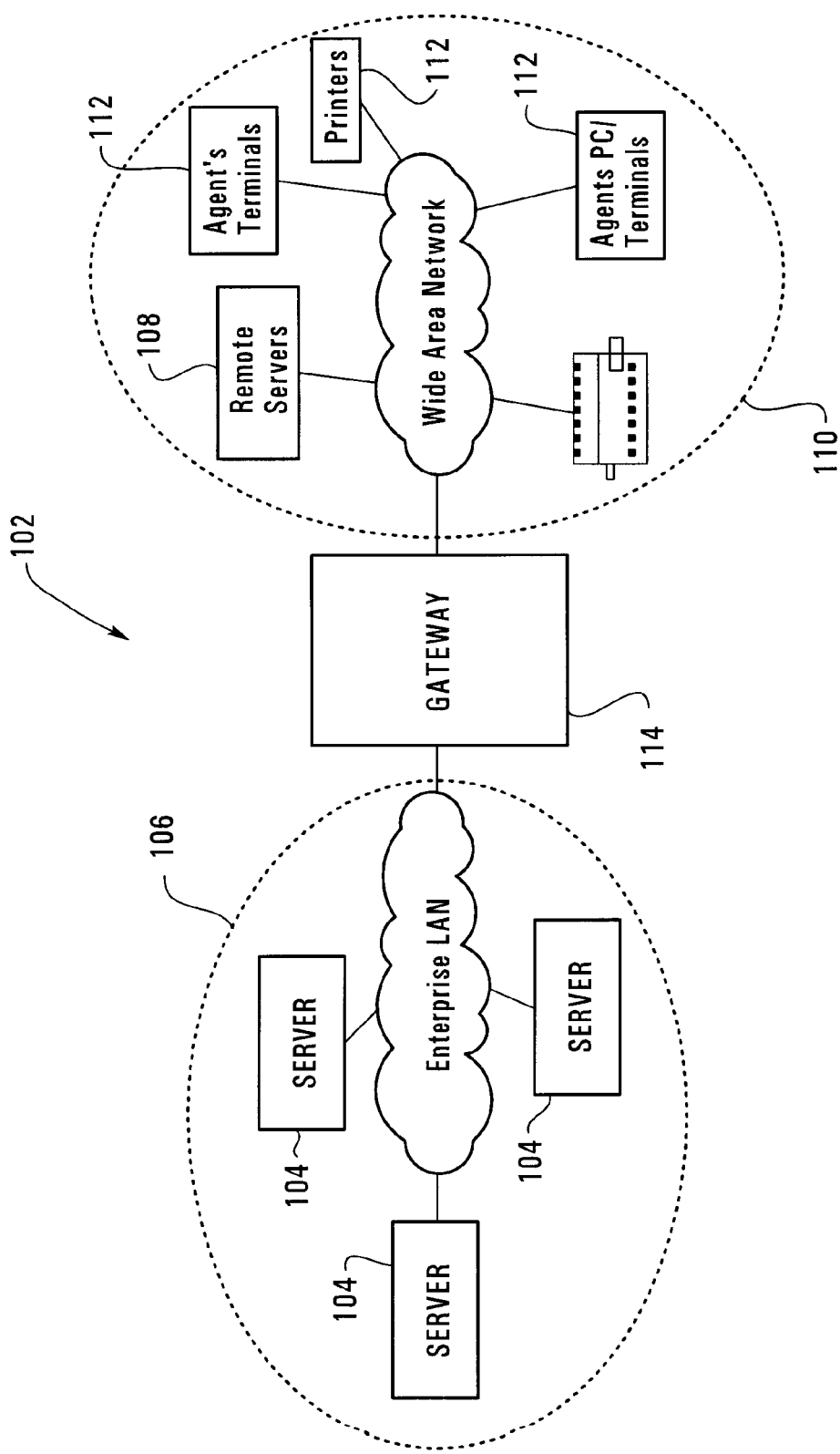
FIG. 1 shows a prior art Centralized Business System.
Figure 2:
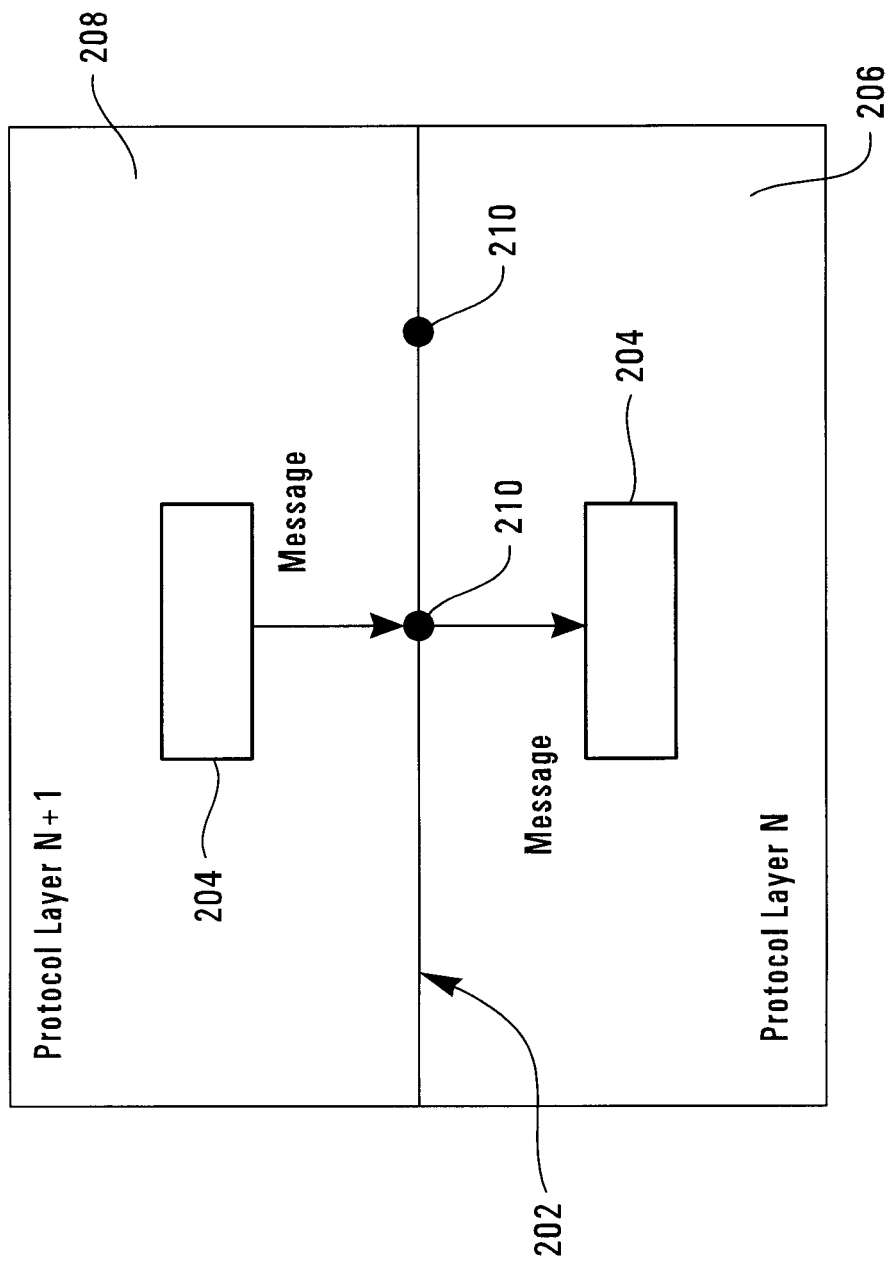
FIG. 2 shows the relationship between two prior art communication protocol layers.

As shown in the drawings for purposes of illustration, the invention provides a novel communication subsystem controller (CSC) for use in a communication subsystem of a computing platform with a memory and a processor. The CSC provides an interface for application programs to access services provided by the communication subsystems. This interface is provided in the form of function calls. An application program makes calls to these functions provided by the CSC to send and receive messages, such as control and data information, from the communication subsystem. The CSC also provides a common interface for any pair of adjacent protocol layers to transfer messages. This interface is also provided in the form of function calls. When a protocol layer sends a message to its adjacent protocol layer, it makes a function call to first send the message to the CSC and the CSC in turn sends the message to the adjacent protocol. That is, the CSC separates the two protocol layers. A protocol layer does not need to have any knowledge of the presence or the contents of its adjacent protocol layers. The function calls forms a common programming interface (CPI).

A user configurable profile name table, implemented as a database, allows a user of the computing platform to specify the series of protocol layers that make up a protocol stack. The CSC reads from this profile name table to build protocol stacks specified in the profile name table. Each record in the database contains information that identifies a particular protocol layer and information that links the record to another record containing the next protocol layer. The user configures the profile name table specifying the order of stacking of individual protocol layers before the CSC is summoned to build the protocol stacks and avail the services provided by the protocol stacks. The task of building protocol stacks is greatly reduced since each protocol layer needs to be implemented to be able to interoperate only with the CSC and not the multitude of protocol layers which it may have to interoperate with.

For providing a clearer description of the present invention, the protocol layers of the OSI reference model will be referenced. In particular, the seven layers of the OSI reference model will be used in this description. However, by referencing the OSI layers, it should not be construed that the invention is limited to the seven layers in the OSI reference model.

In a computing platform, network-dependent layers are usually provided to allow the computing platform to communicate with other computing platforms connected to the communication network. The network-dependent layers usually include protocol layers which provide services similar to those provided by the Network layer, Data Link Layer and Physical layers in the OSI reference model. The Transport Layer, for example the Transport Control Protocol, is also sometimes provided as part of the network-dependent layers. The network-dependent layers are either implemented as part of the operating system (OS) of a computing platform or they may be provided as a separate software library. A computing platform connected to a communication network is known as a node.

The network-dependent layers are separated from the upper layers by an adapter layer. The adapter layer shields the CSC from platform specific OS calls for accessing services provided by the network-dependent protocol layers. The CSC can access the services provided by the network-dependent layers directly by having platform specific OS calls embedded in the software implementing the CSC. This renders the software implementing the CSC difficult to port as the platform specific OS calls may be located in many different parts of the CSC software. By restricting the platform specific OS calls to the adapter layer, porting of the CSCs and adapter layer to different platforms is made easier since only the adapter layer needs to be modified. In the context of this invention, a protocol profile is defined as the CSC, the protocol layers subject to the control of the CSC and the adapter layer.

An application program sets up an association to exchange messages with another application program which usually resides on another node. There are two types of associations, sessions and conversations. A session, in the context of this invention, is a logical pipe through a protocol profile on a node through which an application program sends and receives messages. An application program uses a session to send a query that requires a single reply message. When transferring a larger number of messages, a conversation is used instead of a session. A conversation allows an association between two nodes to be sustained for a longer period. The messages transferred over a conversation are sequenced so that in the event of a failure, recovery action can be taken to resume the conversation from a known state. In the preferred embodiment of the invention, a conversation is built on a session. More than one conversation may be built over a given session. Conversations are dynamically created and destroyed by the application programs.

Figure 3:
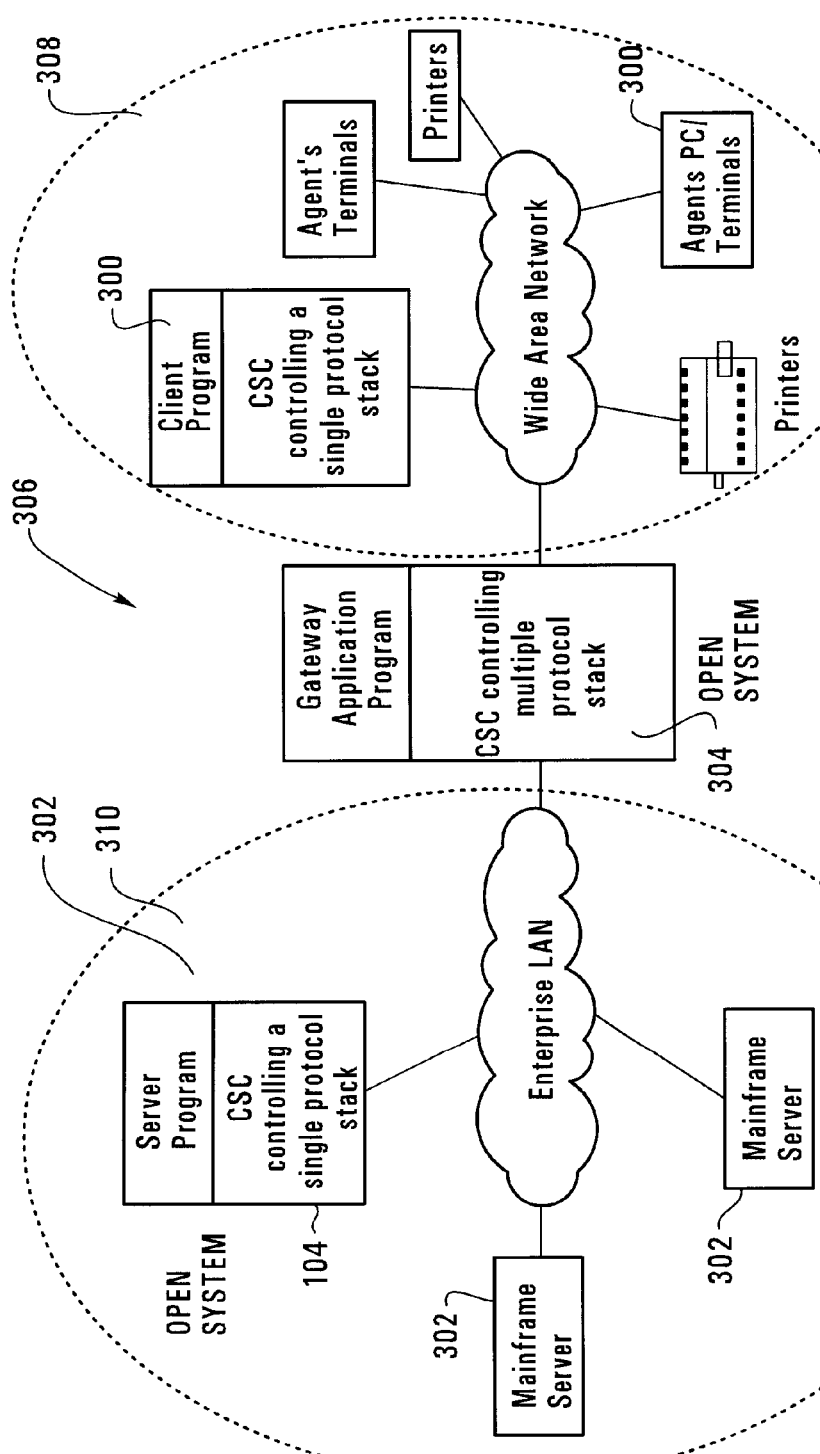
FIG. 3 shows nodes in a Centralized Business System employing a preferred embodiment of the present invention.

FIG. 3 shows the nodes 300, 302, 304 in a Centralized Business System 306 employing a preferred embodiment of the invention to control protocol stacks within the communication subsystems of the nodes 300, 302, 304. The client nodes 300 and the server nodes 302 are connected to dissimilar communication networks 308, 310. Messages are transferred between the client nodes 300 and server nodes 302 through the gateway node 304. The CSCs on the client nodes 300 and server nodes 302 control a single protocol stack each in their respective nodes. The CSC in the gateway node 304 controls multiple protocol stacks within the same gateway node 304. The need to manage a variety of protocol stacks on the gateway node 306 renders the invention indispensable.

Figure 4:
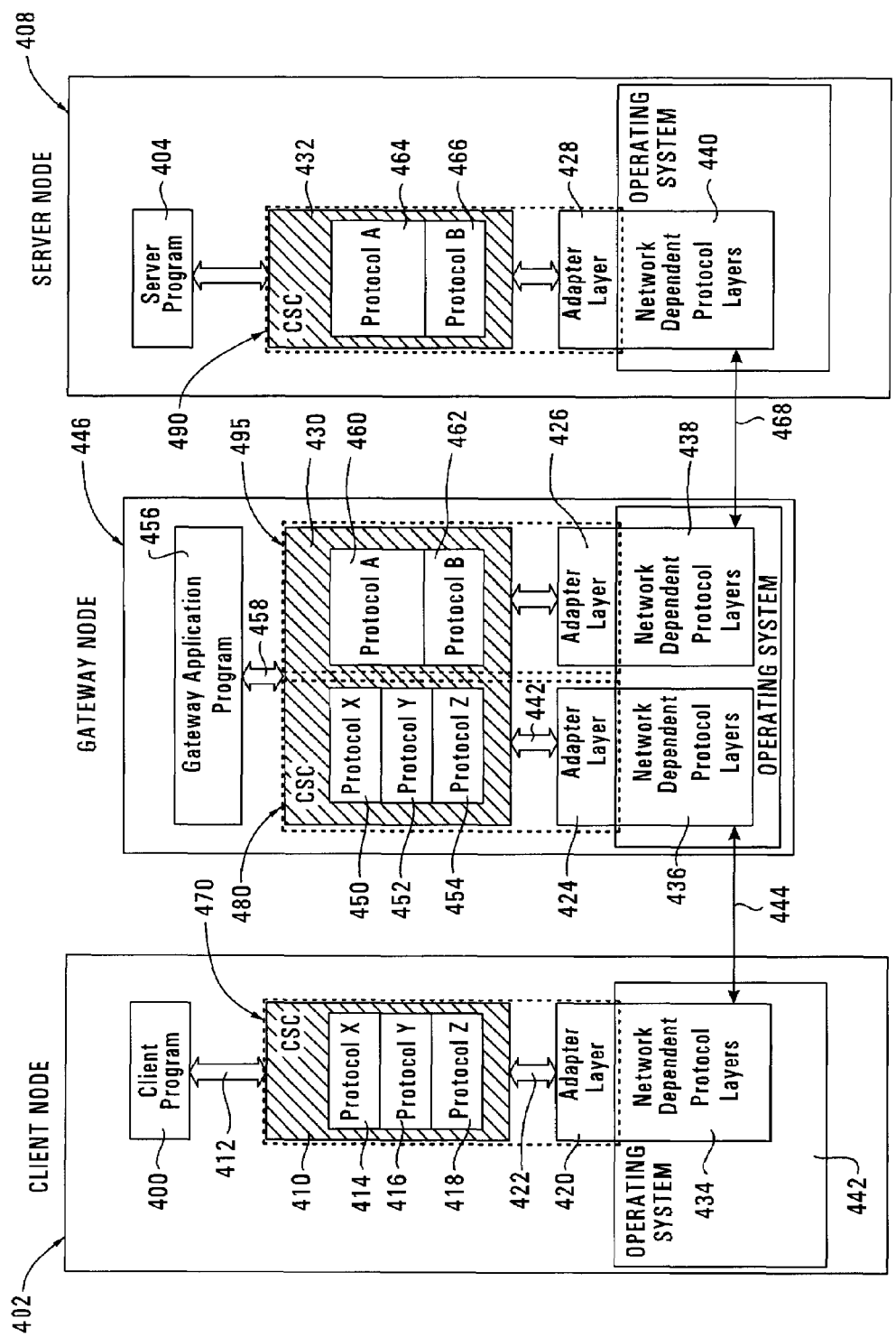
FIG. 4 is a block diagram of a client node, a gateway node and a server node each employing a communication subsystem controller according to a preferred embodiment of present invention.

A client-server transaction using the preferred embodiment of the invention is now described using an example of an airline reservation system as shown in FIG. 4. A typical client-server transaction starts when a client program 400 on a client node 402 invokes a service request. An example of a service request is a query for seat availability on a particular flight. The client program 400 then expects a reply from a server program 404 that resides on a server node 408. The service request is sent to a CSC 410 as indicated by an arrow 412. After the CSC 410 receives the service request, and depending on which protocol layer is processing the service request, the service request may result in one or more messages. For ease of description, the service request will be represented by a message when the CSC 410 receives it. The CSC 410 delivers the message down a first series of protocol layers X 414, Y 416, Z 418. The details of how a message is delivered through the first series of protocol layers X 414, Y 416, Z 418 will be provided later. At each protocol layer X 414, Y 416, Z 418 in the first series, the message is transformed appropriately depending on the service provided by the protocol layer. Knowledge of these services is known to those skilled in the art. As an example, appropriate headers and trailers are added at each first series protocol layer X 414, Y 416, Z 418. After the CSC 410 has delivered the message through the first series of protocol layers X 414, Y 416, Z 418, the CSC 410 passes the message to an adapter layer 420, as indicated by an arrow 422. After the adapter layer 420 receives the message from the CSC 410, the adapter layer 420 passes the message to a stack of network-dependent protocol layers 434 that is supported by a platform-specific operating system 442. The stack of network-dependent protocol layers 434 attaches headers and trailers to the message if required and then sends the message out on a network channel 444. Examples of the network channel 444 are wide area networks (WAN) and the Internet.

As the client node 402 and the server node 408 are connected to dissimilar communication networks and employ different protocol stacks, the client node 402 sends the message to a gateway node 446 for protocol translation. At the gateway node 446, a stack of network-dependent protocol layers 436 receives the message and strips off the appropriate headers and trailers, if present, from the message. The stack of network-dependent protocol layers 436 sends the processed message to the CSC 430 via an adapter layer 424 as indicated by an arrow 442. The CSC 430 delivers the message up a second series of protocol layers X 450, Y 452, Z 454 which mirrors the first series of protocol layers X 414, Y 416, Z 418, used at the client node 402. The CSC 430 passes the message to a gateway application program 456 as indicated by an arrow 458. The message on crossing this CSC 430 and gateway application program 456 interface becomes exactly the same service request as sent by the client program 400. A typical function of the gateway application program 456 is to route messages to the appropriate nodes.

The gateway application program 456 delivers the translated service request down a third series of protocol layers A 460, B 462 using the CSC 430. This third series of protocol layers A 460, B 462 also mirrors a fourth series of protocol layers A 464, B 466 at the server node 408. A resultant server node-bound message which contains the translated service request is delivered to the server node 408 via an adapter layer 426 and a stack of network-dependent protocol layers 438 over a network channel 468 which is dissimilar from the channel network 444. An example of the network channel 468 is an enterprise local area network (E-LAN).

The message is delivered to the server program 404, as the translated service request, via a stack of network-dependent protocol layers 440, an adapter layer 428, and the fourth series of protocol layers A 464, B 466. The server program 404 processes the translated service request and, by the same method as described above, sends a reply to the client node 402 via the gateway node 446.

Figure 5:
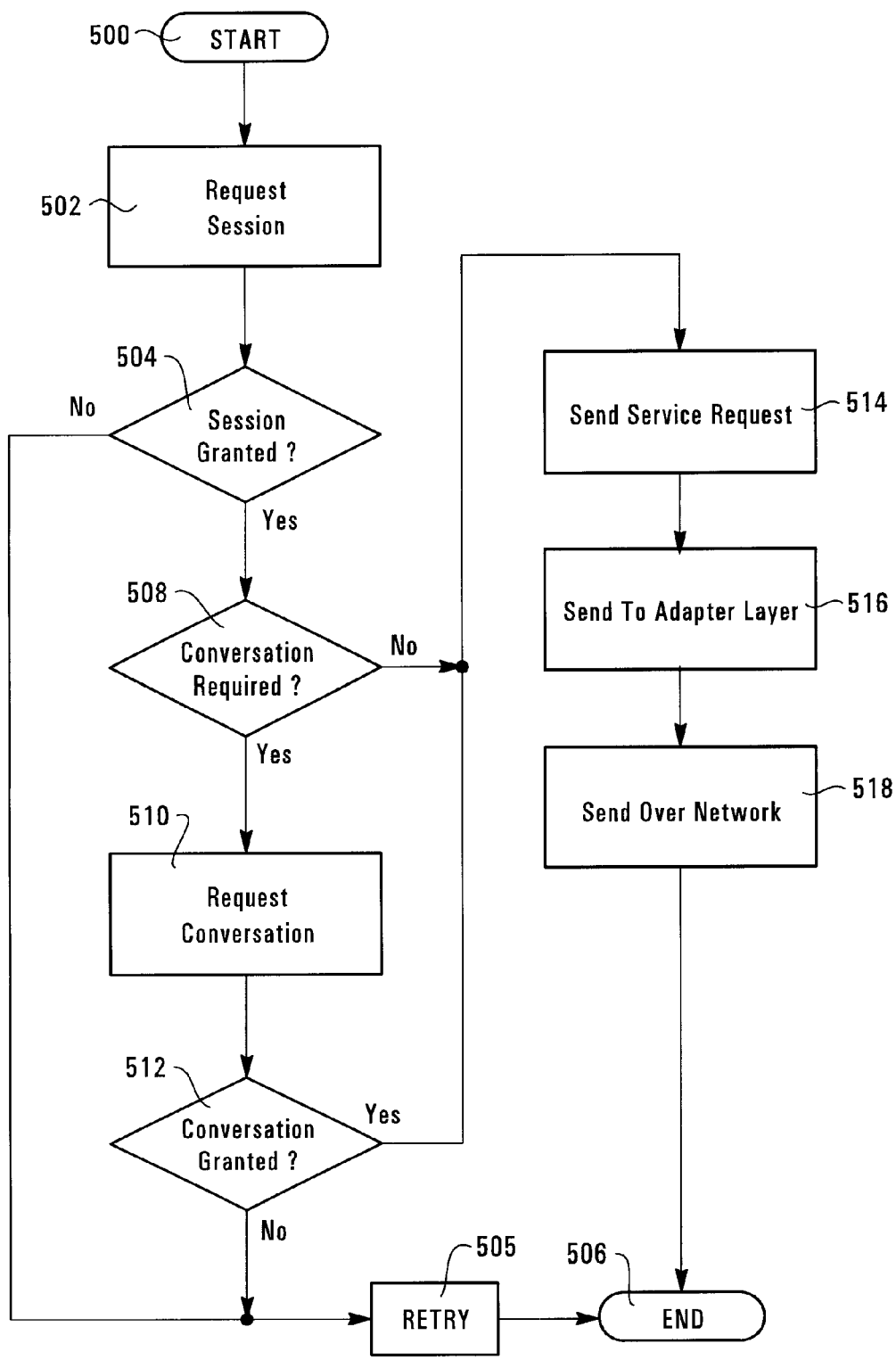
FIG. 5 is a flowchart illustrating a method of sending a service request in a client node using the communication subsystem controller in FIG. 4.

The operational aspect of the preferred embodiment is now described by way of an example as a sequence of steps in the client node 402 (FIG. 4). A send sequence involved in invoking the service request is shown in FIG. 5. The send sequence starts with a Start step 500 and proceeds to a Request Session step 502 where the client node 402 (FIG. 4) requests a session of a particular protocol profile from the CSC 410 (FIG. 4). If a session is unavailable, as decided in a Session Granted? step 504, the send sequence proceeds to a Retry step 505, where the client program invokes a retry action. An example of the retry action is a kicking off of a retry timer. The send sequence then ends at an End step 506. When the retry timer expires, the client program attempts a retry where the send sequence is repeated. If a session is granted, as decided in the Session Granted? step 504, the send sequence continues at a Conversation Required? step 508 where the client node 402 (FIG. 4) determines if a conversation is required. If a conversation is not required as decided in the Conversation Required? step 508, the send sequence continues at a Send Service Request step 514. If a conversation is required as decided in the Conversation Required? step 508, the client node 402 (FIG. 4) requests a conversation in a Request Conversation step 510, over the granted session in the Session Granted? step 504. If a conversation is unavailable, as decided in a Conversation Granted? step 512, the send sequence proceeds to the Retry step 505 where the retry action as described above is executed. The send sequence then ends at an End step 506. If a conversation is granted, as decided in the Conversation Granted? step 512, the send sequence continues at the Send Service Request step 514, where the CSC 410 (FIG. 4) delivers the service request down the first series of protocol layers X 414, Y 416, Z 418 as specified by a client protocol profile 470 (FIG. 4). A detailed description of how the CSC 430 (FIG. 4) delivers a message down the second series of protocol layers X 450, Y 452, Z 454 will be provided later. The service request is next sent to the adapter layer 420 (FIG. 4) in a Send To Adapter Layer step 516 for onward delivery out onto the network channel 444 (FIG. 4) via a Send Over Network step 518. The service request invocation ends at the End step 506.

Figure 6:
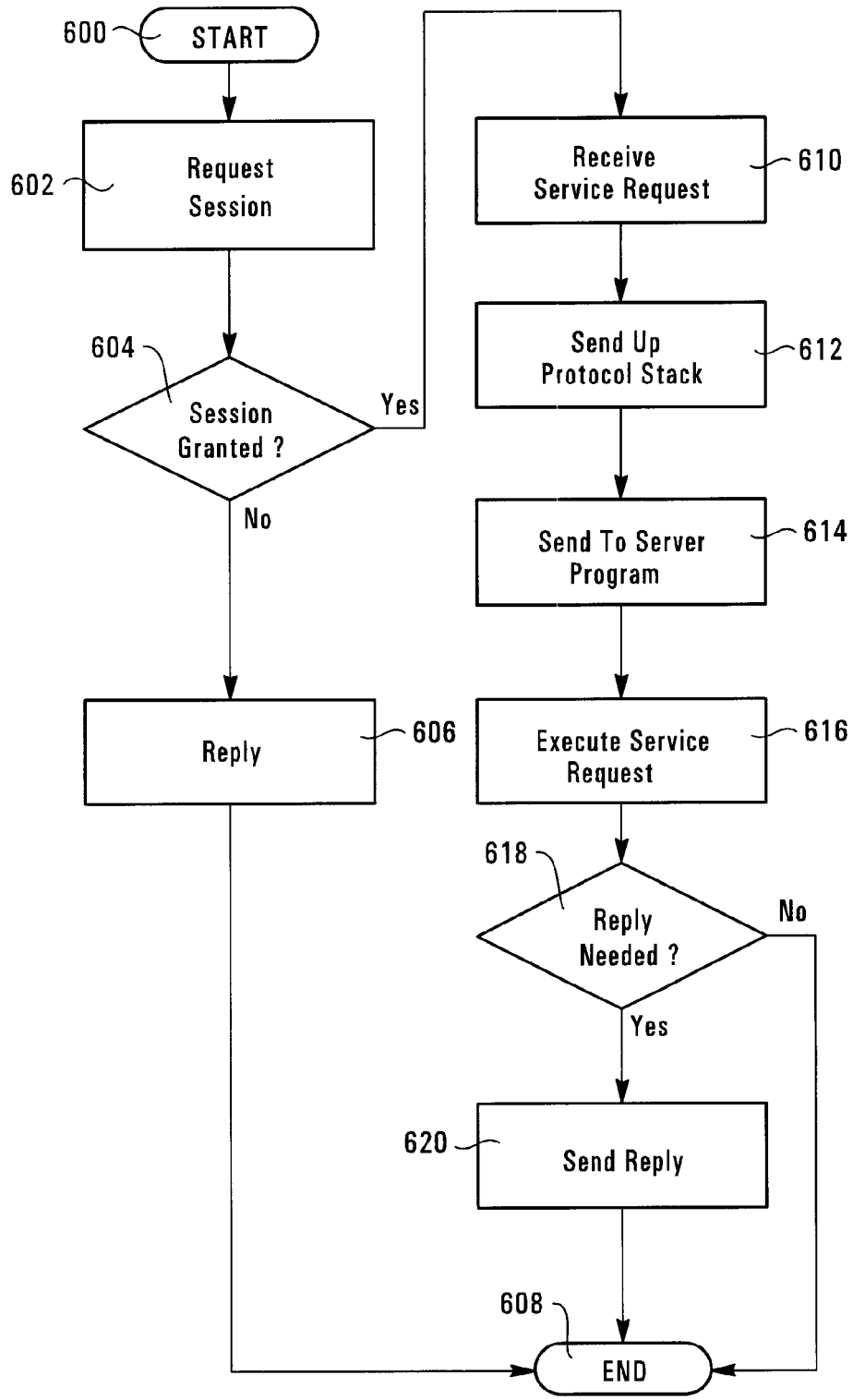
FIG. 6 is a flowchart illustrating a method of receiving a service request in a server node using the communication subsystem controller in FIG. 4.

A sequence of steps in the server node 408 (FIG. 4) involved in the receipt of the message containing the service request is shown in FIG. 6. The receipt sequence starts in a Start step 600 and proceeds to a Request Session step 602 where the server program 404 (FIG. 4) requests a server session of a server protocol profile 490 from the CSC 432 (FIG. 4). If the CSC 432 (FIG. 4) does not grant a session, as decided in a Session Granted? step 604, the receipt sequence proceeds to a Reply step 606, where the CSC 432 (FIG. 4) either rejects or discards the message containing the service request. The receipt sequence then ends in an End step 608. If CSC 432 (FIG. 4) grants a session, as decided in a Session Granted? step 604, the receipt sequence continues at a Receive Service Request step 610, where the CSC 432 (FIG. 4) receives the message from the adapter layer 428 (FIG. 4). The CSC 432 (FIG. 4) sends the message up the fourth series of protocol layers A 464, B 466 (FIG. 4) in a Send Up Protocol Stack step 612. This sending of the message up the protocol stack is similar to the CSC 410 (FIG. 4) in the client node 402 (FIG. 4) sending the message down the first series of protocol layers X 414, Y 416, Z 418 (FIG. 4). The details of how a message is delivered through the second series of protocol layers X 450, Y 452, Z 454 will be provided later. The CSC 432 (FIG. 4) passes the message to the server program 404, as the service request, in a Send To Server Program step 614 after sending the message up the fourth series of protocol layers A 464, B 466 (FIG. 4). The server program 404 executes the service request in an Execute Service Request step 616. If the server program 404 (FIG. 4) determines that a reply is not required as decided in a Reply Needed? step 618, the receipt sequence ends in the End step 608. If the server program 404 (FIG. 4) decides that a reply is necessary in the Reply Needed? step 618, the server program 404 (FIG. 4) sends the reply down the server session. The server session is the same server session granted in the Session Granted? step 604. The sequence of steps involved in sending the reply is the same as the send sequence of the client node 402 (FIG. 4) as described above.

The send and receipt sequences for sending and receiving of messages on the gateway node 446 are similar to the client program 400 in the client node 402 sending the service request and the server program 404 in server node 408 receiving the message containing the service request. The main function of the gateway node 446 is to route messages through two different protocol profiles. The gateway node 446 receives the message from the client node 402 over a protocol profile 480 that mirrors the client protocol profile 470. The gateway application program 456 translates the service request and sends it down a protocol profile 495 that mirrors a server protocol profile 490.

Figure 7:
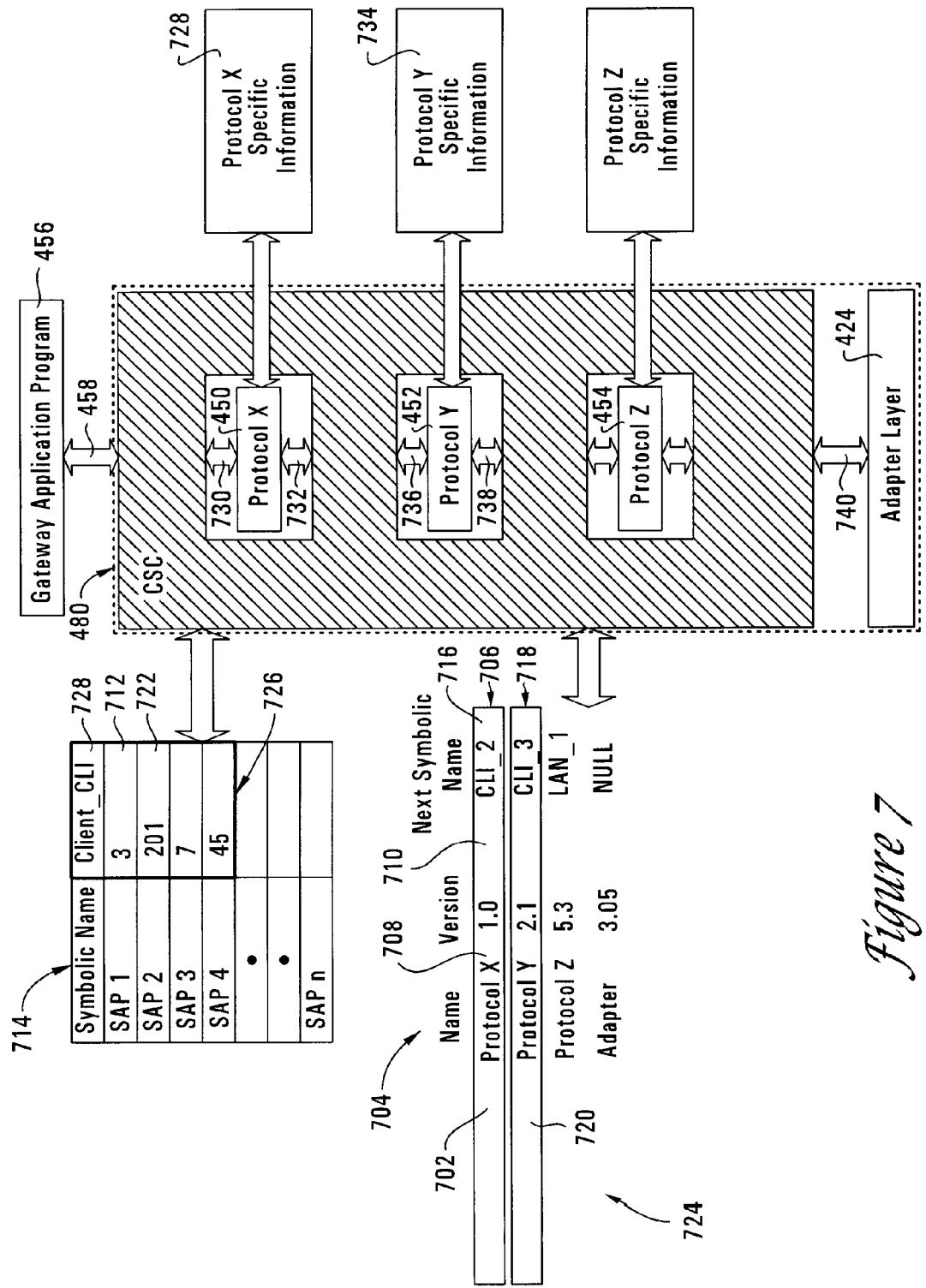
FIG. 7 shows the interaction between the communication subsystem controller and a series of protocol layers in a protocol profile in the gateway node in FIG. 4.

The interaction between the CSC 430 with the protocol layers X 450, Y 452, Z 454 and the adapter layer 424 as shown in FIG. 7 is now described in more details. This interaction during the processing of a request for a session and the sending of a message using the session is described with the aid of flowcharts as shown in FIGS. 8A and 8B. A sequence of steps involved in the gateway node 446 (FIG. 4) during the request of a session by the gateway application program 456 (FIG. 7) is shown in FIG. 8A. A sequence of steps involved in the gateway node 446 (FIG. 4) when sending the message down the protocol profile 480 is shown in FIG. 8B.

The request session sequence as shown in FIG. 8A begins with a Start step 800, where the gateway application program 456 (FIG. 7) requests from the CSC 430 (FIG. 7) a session over the protocol profile 480 (FIG. 7). The gateway application program 456 (FIG. 7) identifies the protocol profile 480 (FIG. 7) by a Symbolic Name entry 702 in a Profile Name Table 704. This Profile Name Table 704 is configured prior to the gateway node 446 (FIG. 7) starting up. The configuration involves making entries into the Profile Name Table 704 which is implemented in a database. The CSC 430, on receipt of the session request, retrieves a tuple 706 from the Profile Name Table 704 using the Symbolic Name entry 702 as a primary key. The CSC 430 then requests for a service access point (SAP) from the Protocol X 450 (FIG. 7), in a Request SAP step 802. The Protocol X 450 information is obtained from a Name entry 708 and Version entry 710 in the tuple 706. The Name entry 708 together with the Version entry 710 in the tuple 706 in the Profile Name Table 704 uniquely identifies the protocol layer, Protocol X 450 (FIG. 7). If a SAP is not granted by the Protocol X 450 (FIG. 7), as decided in a SAP Granted? step 804, due for example to a lack of resources in the Protocol X 450 (FIG. 7), the request session sequence ends in an End step 806. If a SAP is granted by the Protocol X 450, as decided in the SAP Granted? step 804, the request session sequence proceeds to a Store SAP step 808 where the CSC 430 (FIG. 7) stores the granted SAP 712 in a SAP Data Structure 714. The granted SAP 712 is also stored in a persistent storage, for example in a SAP file or database on a hard disk in the node. The SAP 712 identifies a resource in Protocol X 450 to be used when transferring messages between the CSC 430 (FIG. 7) and the Protocol X 450 (FIG. 7). The CSC 430 next looks at the Next Symbolic Name entry 716 in a Last Layer? step 810. If the Next Symbolic Name entry 716 is not a NULL, as decided in the Last Layer? step 810, the CSC 430 (FIG. 7) extracts a second tuple 718 whose Symbolic Name entry 720 matches the Next Symbolic Name entry 716 of the tuple 706. The CSC 430 (FIG. 7) repeats the Request SAP step 802 where the CSC 430 (FIG. 7) requests for a SAP from the Protocol Y 452 (FIG. 7) as indicated in the tuple 718. If a SAP is not granted by the Protocol Y 452, as decided in the SAP Granted? step 804, the request session step ends in the End step 806. If a SAP is granted by the Protocol Y 452 (FIG. 7), the CSC 430 (FIG. 7) stores the granted SAP 722 in the SAP Data Structure 714 as well as in the persistent storage. The CSC 430 (FIG. 7) repeats the Request SAP step 802, the SAP Granted? step 804 and the Store SAP step 808 for each subsequent tuple in a protocol profile specification 724 in the Profile Name Table 704. These three steps are repeated using the method described until the Next Symbolic Name entry is a NULL, as decided in the Last Layer? step 810. When a Next Symbolic Name entry is a NULL, the request session sequence ends in the End step 806. If each protocol layer in the protocol profile specification 724 grants an SAP during the request session sequence, the SAP Data Structure 714 stores a list of SAPs 726 associated with the protocol layers X 450, Y 452, Z 454 and the adapter layer 424 (FIG. 7) in the protocol profile 480 (FIG. 7). The SAP entry 712 in the SAP Data Structure 714 being the SAP of the topmost protocol layer, Protocol X 450 (FIG. 7), in the protocol profile 480 (FIG. 7), is designated a handle to the protocol profile 480 (FIG. 7).

A send-down-protocol-stack sequence starts with a Start step 850 and proceeds to a Send To CSC step 852 where the gateway application program 456 (FIG. 7) sends the reply to the CSC 430 as indicated by an arrow 458 (FIG. 7). The gateway application program 456 (FIG. 7) indicates the protocol profile 480 (FIG. 7) to be used for a delivery of the reply by passing the handle 712 in the SAP Data Structure 714 to the CSC 430 (FIG. 7). The CSC 430 in using the Symbolic Name entry 728 related to the list of SAPs 726 of which the SAP 712 is a part of, locates the protocol profile specification 724 in the Profile Name Table 704. The protocol profile specification 724 specifies the protocol profile 480 to be used for the delivery of the reply. The CSC 430 uses the handle 712 to identify the resource in Protocol X 450 (FIG. 7) to be used to send the message to the Protocol X 450 (FIG. 7). The CSC 430 (FIG. 7) sends the message to the Protocol X 450 (FIG. 7) in a Send To Protocol Layer step 854. The Protocol X 450 uses information in a Protocol X Specific Information 728 associated with the tuple 706 of the Profile Name Table 704 to formulate and add an appropriate header and trailer to the message. Examples of protocol specific information are local addresses, remote addresses, the maximum number of conversations that can be supported by the protocol layers and whether the protocol layers are initiators or responders. The CSC 430 (FIG. 7) next determines that the Protocol X 450 (FIG. 7) is not the last layer in the protocol profile 480 (FIG. 7) since the Next Symbolic Name entry 716 is not NULL. The send-down-protocol-stack sequence continues with Protocol X 450 (FIG. 7) sending the message back to the CSC 430 (FIG. 7) as indicated by an arrow 732, in the Send To CSC step 852. The Protocol X 450 (FIG. 7) also sends Protocol X recovery information to the CSC 430 (FIG. 7). Examples of Protocol X 450 (FIG. 7) recovery information are Protocol X 450 (FIG. 7) sequence numbers, Protocol X (FIG. 7) timer values and Protocol X 450 (FIG. 7) state machine variables. The CSC 430 (FIG. 7) maintains the recovery information until a later step which will be described later. The CSC 430 (FIG. 7) next uses the same traversal method as the request session sequence above to send the message to the Protocol Y 452, as indicated by an arrow 736, in the Send To Protocol Layer step 854. Protocol Y 452 uses information in a Protocol Y Specific Information 734 associated with the tuple 718 of the Profile Name Table 704 to formulate and add an appropriate Protocol Y 452 header and trailer to the message. The Protocol Y 452 (FIG. 7), not being the last layer of the protocol stack 480 (FIG. 7), sends the processed message and Protocol Y 452 (FIG. 7) recovery information back to the CSC 430 (FIG. 7), as indicated by an arrow 738, in the Send To CSC step 852. The CSC 430 (FIG. 7) next sends the message to Protocol Z 454 (FIG. 7) using the Send To Protocol Layer step 854, and the Protocol Z 454 (FIG. 7) after processing the message sends the message back to the CSC 430 (FIG. 7) using the Send To CSC step 852. This sending of the message alternately to a next protocol layer and the CSC 430 (FIG. 7) ends when the CSC sends the message to the adapter layer 424, as indicated by an arrow 740. After the adapter layer 424 has processed the message, the CSC 430 stores the recovery information of the second series of protocol layers X 450, Y 452, Z 454 to persistent storage. The send-down-protocol-layers stack then ends in an End step 858.

In the event of a node failure in the middle of the request session sequence, for example due to a hardware malfunction or a power trip, the affected node on powering up restores the SAP Data Structure 714 using the SAP data stored in the persistent storage. The CSC 430 resumes the request session sequence from where the request session sequence left off before the node failure.

The node on powering up, after a power failure during the send-down-protocol-stack sequence, retrieves the recovery information of the second series of protocol layers X 450, Y 452, Z 454 (FIG. 7) from the persistent storage. The CSC 430 (FIG. 7) then invokes a recovery action that reinstates the status of the second series of protocol layers X 450, Y 452, Z 454 (FIG. 7) to that prior to the power failure. After the reinstatement of the second series of protocol layers X 450, Y 452, Z 454 (FIG. 7), the gateway application program 456 (FIG. 7) continues to exchange messages with the CSC 430 (FIG. 7) from where it is left off before the power failure.

Typically for a computing platform that supports threads programming, the CSC is implemented as a process, and each protocol profile as a thread or threads depending on requirements in system performance. The use of threads renders the computing platform to be scalable to achieve better performance by, for example, moving from the computing platform with one processor to one with multiple processors without the need of any modification to be done on the CSC.

Figure 9:
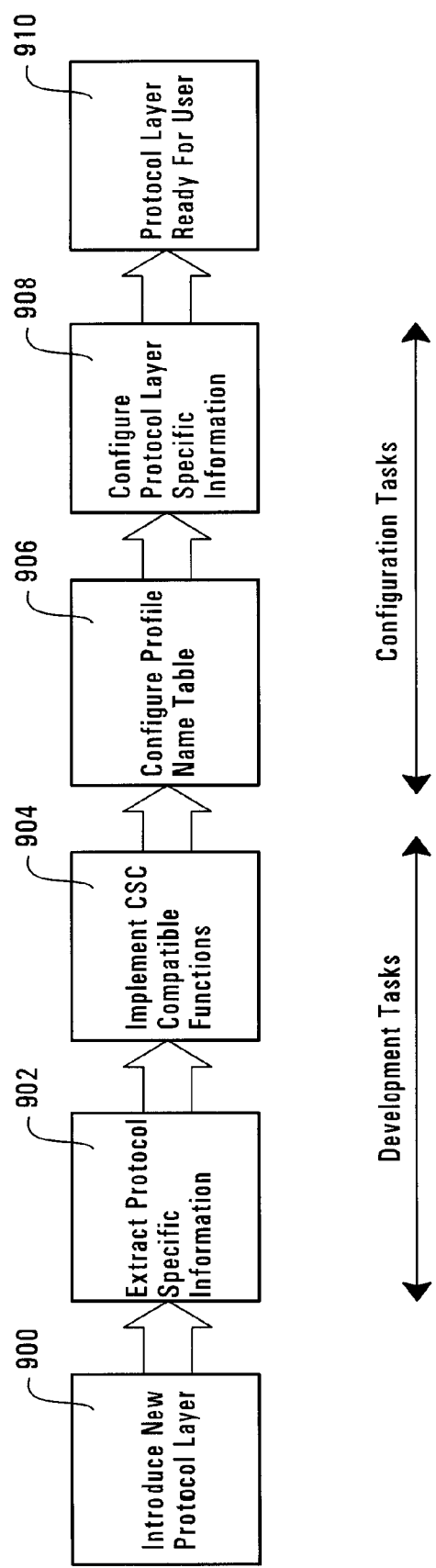
FIG. 9 is a list of the tasks required for an introduction of a new protocol layer to be used with the communication subsystem controller in FIG. 4.

A set of tasks involved in an introduction of a new protocol layer, Protocol P, as shown in FIG. 9 is now described. The set of tasks is classified into two categories, development tasks and configuration tasks. The new protocol layer, Protocol P, is either developed or purchased from a vendor in an Introduce New Protocol Layer task 900. In either case, a software developer determines and extracts a user configurable Protocol P specific information of the new protocol layer, Protocol P, in an Extract Protocol Specific Information task 902. The software developer makes available the user configurable Protocol P specific information to a user through a text file or database entry. The software developer either develops or modifies the new protocol layer to make the new protocol layer, Protocol P, interoperable, or compatible, with the CSC in an Implement CSC Compatible Functions task 904, using the CPI. Some examples of CSC compatible functions are functions related to initialization and termination of a session, functions which allows messages to be sent to the session and error recovery functions. The Implement CSC Compatible Function task 904 concludes the development tasks of the introduction of the new protocol layer, Protocol P.

The configuration phase starts with a Configure Profile Name Table task 906 where the user configures a protocol profile to include the new protocol layer, Protocol P, as part of the protocol profile. The user next configures the Protocol P specific information in a Configure Protocol Specific Information task 908. With the completion of the Configure Protocol Layer Specific Information task 908, the sequence of tasks for introducing the new Protocol P ends in a Protocol Layer Ready For Use task 910.

The CSC may be wholly implemented in a program of instructions executable by a computing platform and the program may be stored in a program storage device which is readable by any compatible computing platform. Examples of such program storage devices are floppy disks, CD-ROMs and ROMs.

The preferred embodiment can be modified in many ways. For example, the CSC in the preferred embodiment of the invention uses a profile name table to store the protocol profile specifications. The profile name table may be eliminated and the protocol profile information may be embedded in an application program. Another example is the use of a recursive function call in the preferred embodiment of the invention to alternately send a message to the CSC and a next protocol layer in delivering the message across a protocol stack. The recursive function may be replaced by having each protocol layer and the CSC implemented as a processes, and interprocess communication mechanisms, for example, message queues, can be used to facilitate the sending of the message from one process to another. As a further example, the CSC may also be implemented in a communication subsystem where it does not provide the interface between every pair of adjacent protocol layers in a protocol profile. For example, some proprietary protocol layers may be bundled and used to form part of a protocol profile where it will not be practical nor feasible for the CSC to provide interfaces between each of these proprietary protocol layers.

We claim:

1. A communication subsystem of a computer for providing connectivity to a communication network, the computer having an application program, a memory and at least one processor, wherein messages are transferred among the application program and a plurality of protocol layers in the communication subsystem using a communication subsystem controller, the communication subsystem using a communication subsystem controller, the communication subsystem comprising:
   a protocol stack having:
   the plurality of protocol layers, and
   the communication subsystem controller, wherein the communication subsystem controller forms interfaces between the application program and its adjacent protocol layer in the protocol stack and at least between a pair of adjacent protocol layers of the protocol stack for transferring messages;
   wherein the communication subsystem controller transfers messages between each protocol layer of the plurality of protocol layers, and between the application program and its adjacent protocol layer in the protocol stack.

2. The subsystem as in claim 1, the memory further having a set of predetermined protocol stack information, wherein the set of predetermined protocol stack information includes at least information of the adjacent protocol layer to the application program and the pair of adjacent protocol layers in the protocol stack.

3. The subsystem as in claim 2, the memory further having a set of service access point information, wherein the set of service access point information includes at least information of service access points used by the adjacent protocol layer to the application program and the pair of adjacent protocol layers in the protocol stack for transferring messages.

4. The subsystem as in claim 1, further comprising a preselected stack of network-dependent protocol layers for providing network-dependent services to the protocol stack for connecting the computer to the communication network.

5. The subsystem as in claim 4, further comprising an adapter layer between the preselected stack of network-dependent protocol layers and its adjacent protocol layer in the protocol stack, wherein the preselected stack of network-dependent protocol layers provide the network-dependent services to the protocol stack through the adapter layer for connecting the computer to the communication network.

6. The subsystem as in claim 1, the computer further having a persistent storage for storing the set of service access point information and a set of recovery information to support recovery activities.

7. A computer comprising:
   an application program that is executed by the computer and stored thereon;
   an adapter layer that interfaces with another program of the computer, wherein the application program and the adapter layer transfer messages to each other;
   a protocol stack that comprises a plurality of protocol layers, and formats a message from one of the application program and the adapter layer into a format useable by the other; and a controller that passes the messages between each protocol layer of the protocol stack, between the application program and an associated layer of the protocol stack, and between the adapter layer and an associated layer of the protocol stack.

8. The computer of claim 7, wherein the another program is an operating system, and the operating system passes the messages with an operating system of another computer.

9. The computer of claim 7, further comprising:
protocol information that is stored in the computer and is used to build the protocol stack.

10. The computer of claim 9, wherein the protocol information comprises at least one of:
information of the layer associated with the application program; and
information of each protocol layer in the protocol stack.

11. The computer of claim 9, wherein the protocol information comprises:
information of service access points for at least one layer of the protocol stack.

12. The computer of claim 9, wherein the protocol information comprises:
a predetermined stack of network dependent protocol layers.

13. The computer of claim 7, wherein the computer is one of:
a client computer, a server computer, and a gateway computer.

14. The computer of claim 7, wherein the controller uses function call to pass the messages.

15. The computer of claim 7, wherein each protocol layer of the protocol stack can only inter-operate with the controller.

16. The computer of claim 7, wherein the another program is a network dependent protocol layer which exchanges messages with a network.

17. The computer of claim 16, wherein the network is one of a local network, a wide area network, and the Internet.

18. The computer of claim 7, wherein the application program initiates an association with the another program to exchange messages with the another program.

19. The computer of claim 18, wherein the association is one of:
a session; and
a conversation.

20. The computer of claim 18, wherein the another program resides on another computer.

21. A computer system comprising at least two computers, wherein each computer comprises:
an application program that is executed by the computer and stored thereon;
an adapter layer that interfaces with an operating system of the computer, wherein the application program and the adapter layer transfer messages to each other, and the operating system passes the messages with an operating system of the other computer of the two computers;
a protocol stack that comprises a plurality of protocol layers, and formats a message from one of the application program and the adapter layer into a format useable by the other; and
a controller that passes the messages between each protocol layer of the protocol stack, between the application program and an associated layer of the protocol stack, and between the adapter layer and an associated layer of the protocol stack.

22. The computer system of claim 21, wherein the a protocol stack of one computer is different from the protocol stack of another computer.

* * * * *